May 11, 1948. J. A. B. RANCOURT 2,441,288
POWER TOOL
Filed Nov. 10, 1944
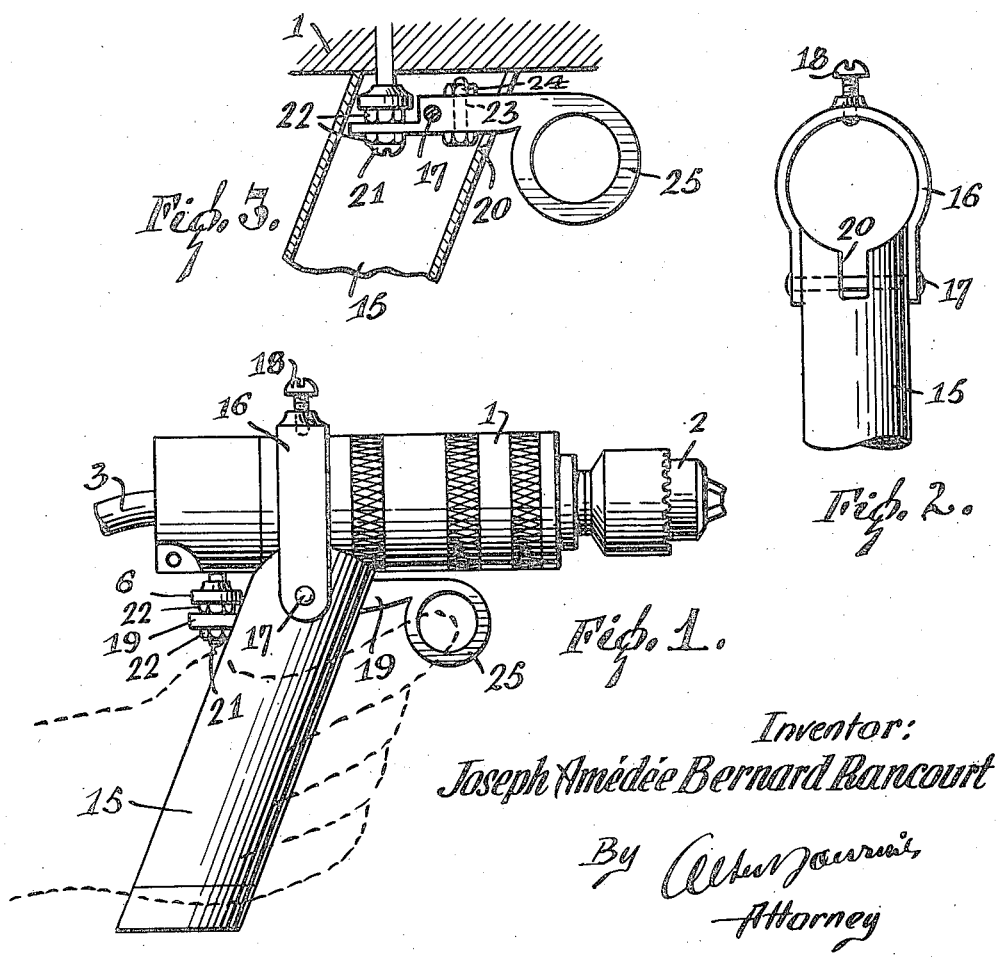
Inventor:
Joseph Amédée Bernard Rancourt Patented May 11, 1948

2,441,288

UNITED STATES PATENT OFFICE 2,441,288

POWER TOOL

Joseph Amedee Bernard Rancourt, Montreal, Quebec, Canada

Application November 10, 1944, Serial No. 563,303
In Canada May 4, 1944

2 Claims. (Cl. 74—503)

The present invention pertains to a power tool and particularly to the means for controlling the power.

In many power tools, such as air drills, the power is controlled by a push button on the body.

The principal object of the invention is to provide a simple device for operating the push button.

In the embodiment the operating lever is mounted in the handle. It engages the push button at one end and has a finger loop at its other end, whereby the lever is conveniently held in the desired position.

The invention is illustrated as having a push button for an air valve, but this represents any operation device such as, for example, a switch button for an electric tool.

The invention is fully disclosed by way of example in the following description and in the accompanying drawing in which;

Figure 1 is an elevation of the device;

Figure 2 is an elevation thereof; and

Figure 3 is a longitudinal section of the device.

Reference to these views will now be made by use of like characters which are employed to designate corresponding parts throughout.

In Figure 1 is shown a conventional air drill having a cylindrical body 1 and a chuck 2. The internal driving mechanism is supplied with air by tube 3.

In Figures 1, 2, and 3, the body 1 is inverted and the operating mechanism placed beneath it. A handle 15 is placed obliquely against the body and is supported by a yoke 16 attached to the handle by a swivel pin 17 and encircling the body. The yoke is locked to the body by a set screw 18.

An operating lever 19 is passed through a pair of slots 20 in the upper end of the handle and is swiveled on the pin 17. The rear end of the lever carries a stud 21 with set screws 22 on both ends to provide an adjustable member for engaging the push button 6. At the forward side of the pin 17 the lever carries a similar stud 23 with set screws 24 on both ends to provide an adjustable stop against the body 1. The forward end of the lever 19 is formed with a loop 25 to receive the forefinger of the operator, as shown in Figure 3. The push button 6 is operated by a simple lever action and is maintained in the depressed position by finger pressure on the loop 25.

Although specific embodiments of the invention have been illustrated and described, it will be understood that various alterations in the details of construction may be made without departing from the scope of the invention as indicated by the appended claims.

What I claim to be my invention is:

1. In a power driven tool, a body, a push button on said body for controlling the power applied to the tool, a handle fitted to said body, a yoke extending from said handle over said body, a set screw securing said yoke to said body, and a lever pivotally mounted in said handle and adapted to engage said button.

2. In a power tool, a body, a push button on said body for controlling the power applied to the tool, a handle fitted to said body, a yoke extending from said handle over said body, a set screw securing said yoke to said body, a lever pivotally mounted on said handle and having one end adapted to engage said button, and a finger loop on the other end of said lever.

JOSEPH AMEDEE BERNARD RANCOURT.

REFERENCES CITED

The following references are of record in the file of this patent:

UNITED STATES PATENTS

| Number | Name | Date |
| --- | --- | --- |
| 1,382,641 | Heinrich | June 28, 1921 |
| 1,620,230 | Renholdt | Mar. 8, 1927 |

FOREIGN PATENTS

| Number | Country | Date |
| --- | --- | --- |
| 5,000 | Great Britain | Feb. 28, 1910 |
| 350,908 | Great Britain | June 15, 1931 |